United States Patent [19]

Matsumoto et al.

[11] Patent Number: 5,291,356

[45] Date of Patent: Mar. 1, 1994

[54] DISK STORAGE DEVICE HAVING EJECT MEMBER

[75] Inventors: Kenji Matsumoto, Hoya; Yoshio Hirose, Urawa; Yoshiaki Sakai, Higashikurume; Hiroshi Takemoto, Fuchu; Takashi Watanabe, Ichikawa; Katsuhiko Noda, Higashiyamato, all of Japan

[73] Assignee: TEAC Corporation, Japan

[21] Appl. No.: 979,629

[22] Filed: Nov. 20, 1992

[30] Foreign Application Priority Data

Nov. 28, 1991 [JP] Japan .............................. 3-098336[U]
Jan. 27, 1992 [JP] Japan .............................. 4-002390[U]

[51] Int. Cl.$^5$ .............................................. G11B 21/22
[52] U.S. Cl. .................... 360/99.06; 369/77.2; 369/13
[58] Field of Search ............ 360/99.06, 99.02; 369/13, 77.2, 75.1

[56] References Cited

U.S. PATENT DOCUMENTS 4,777,550 10/1988 Taguchi et al. ................. 360/99.06
4,878,139 10/1989 Hasegawa et al. ............... 360/99.06

FOREIGN PATENT DOCUMENTS 61-192064 8/1986 Japan .............................. 360/99.06

*Primary Examiner*—Robert J. Pascal
*Assistant Examiner*—Tan Dinh
*Attorney, Agent, or Firm*—Andrus, Sceales, Starke & Sawall

[57] ABSTRACT

A disk storage device includes a head part for writing data to a storage disk inserted into the device and for reading data from the disk, an eject member which is operated when a disk cartridge containing the disk is ejected, a turntable for rotating and driving the disk thereon to perform data recording and reproducing with the head part, a holder for holding the disk cartridge containing the disk, the holder placing the disk at a read/write position on the turntable when the disk cartridge is inserted, a slider which is disconnected from a latch lever when the disk cartridge is inserted and is moved in a direction parallel to the direction of insertion of the disk cartridge so as to place the disk at the read/write position on the turntable, and a movement mechanism for moving the holder and the disk cartridge from the read/write position of the turntable to an insertion position in response to a movement of the slider in the direction opposite to the first direction when the eject member is operated. In this device, the eject member is mounted flat on an upper portion of a frame of the disk storage device which portion is parallel to a surface of the turntable, the eject member having an operation part which is operated by applying an external force thereto, and a transfer part connected to an end portion of the slider.

8 Claims, 16 Drawing Sheets

FIG. 2A
FIG. 2B
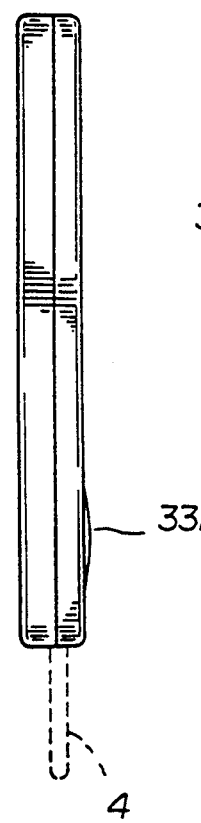
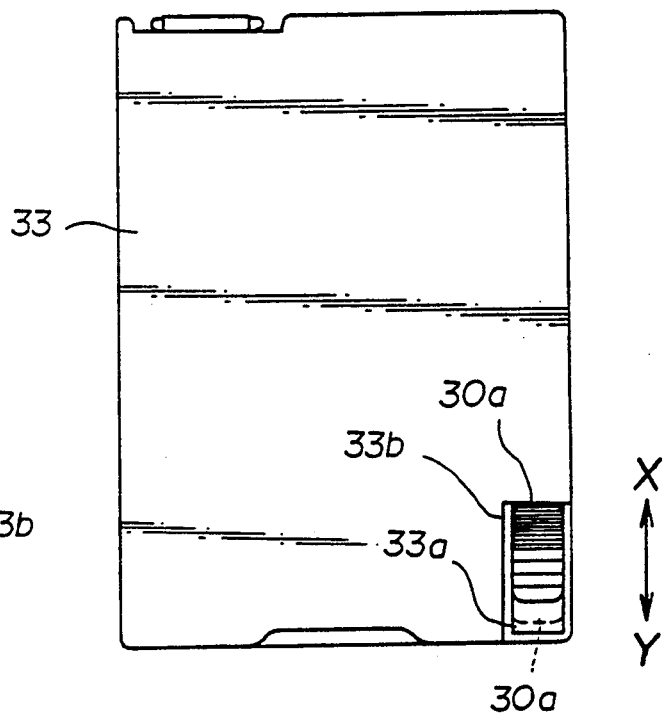
FIG. 2C
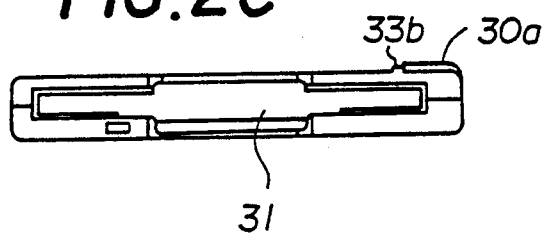

DISK STORAGE DEVICE HAVING EJECT MEMBER

BACKGROUND OF THE INVENTION (1) Field of the Invention

The present invention generally relates to disk storage devices, and more particularly to a disk storage device for writing data to a storage disk and reading data from the storage disk, the disk storage device having a mechanism for making the disk storage device portable and thin.

(2) Description of the Prior Art

FIG. 1 shows a conventional disk storage device 50 for recording data on a magnetic disk and reproducing data from the magnetic disk. In this disk storage device 50, a flexible magnetic disk accommodated in a disk cartridge is inserted into the disk storage device through an insertion opening 51 in a front frame surface 53 in a direction indicated by an arrow A in FIG. 1. The magnetic disk is placed at a read/write position on a turntable within the disk storage device, so that data is written to and read from the magnetic disk by means of a magnetic head part.

In the disk storage device 50 shown in FIG. 1, there are provided a holder for holding the disk cartridge and mounting the disk at the read/write position, a turntable for driving the magnetic disk to perform the data reading and writing, and a slider which is disconnected from a latch lever when the disk cartridge is loaded, and which is moved to place the disk of the disk cartridge at the read/write position on the turntable. When the slider is moved in cooperation with the disk cartridge, the holder is moved toward the turntable so that the magnetic disk in the holder is placed at the read/write position on the turntable.

On the front frame surface 53, an end portion of an eject member 52 is provided below the insertion opening 51. This eject member 52 is connected at the other end thereof to the slider inside the disk storage device 50. When the end portion of the eject member 52 is depressed in the direction A by a user, the slider is moved with the eject member 52, so that the holder and the disk cartridge therein are detached from the read/write position of the turntable in conjunction with the slider. At the same time, an eject lever provided therein serves to eject the disk cartridge from the holder in a direction opposite to the direction A so that the magnetic disk is unloaded from the disk storage device.

The conventional disk storage device described above is usually placed on a surface of a table when it is used. However, the end portion of the eject member is located near the surface of the table, and the disk cartridge is ejected while the eject member is operated. The user may encounter a difficulty in that the disk cartridge is not smoothly ejected from the disk storage device, since the disk cartridge may interfere with the user finger upon depression of the eject member. Also, in the conventional disk storage device, it is necessary that the end surface of the eject member protrudes from the front frame surface of the disk storage device. The eject member may be erroneously depressed due to the mounting location thereof, and the disk cartridge is ejected even when the disk storage device is operating. If the disk cartridge is erroneously ejected while data is being written to the disk, valuable data stored in the disk may be damaged.

Therefore, in the case of the conventional disk storage device, there is a problem in that the user cannot easily and stably operate the disk storage device due to the location and construction of the eject member. Also, it is necessary that the end surface of the eject member has a certain surface area enough for the users to easily operate. However, in the conventional disk storage device, there is a tradeoff between the ease of use and the design of a mechanism for making the disk storage device portable and thin.

SUMMARY OF THE INVENTION

Accordingly, it is a general object of the present invention to provide an improved disk storage device in which the above described disadvantages are eliminated.

Another, more specific object of the present invention is to provide a disk storage device having a mechanism for making the disk storage device portable and thin, in which a disk cartridge is easily and stably ejected from the disk storage device when an eject member is operated by an operator.

Still another object of the present invention is to provide a disk storage device having a mechanism for preventing the eject member from being easily disconnected from the mounting portion of the device even when an external force is applied to the eject member in such a direction as to separate the eject member from the mounting portion of the device.

The above objects of the present invention are achieved by a disk storage device which includes a head part for writing data to a storage disk inserted into the disk storage device and for reading data from the storage disk, an eject member which is operated when the storage disk is ejected from the disk storage device, a turn table for rotating and driving the storage disk thereon to perform data recording and reproducing in cooperation with the head part, a holder for holding a disk cartridge containing the storage disk, the holder placing the storage disk at a read/write position on the turntable, when the disk cartridge is inserted, by fitting a center hole of the storage disk on a spindle of the turntable, a slider which is disconnected from a latch lever when the disk cartridge is inserted, and is moved in a first direction substantially parallel to a direction of insertion of the disk cartridge so as to place the storage disk at the read/write position on the turntable, and a movement mechanism for moving the holder and the disk cartridge from the read/write position of the turntable to an insertion position in response to a movement of the slider in a direction opposite to the first direction when the eject member is operated, wherein the eject member is mounted flat on an upper portion of a frame of the disk storage device which portion is parallel to a surface of the turntable, the eject member having an operation part which is operated by applying an external force thereto, and a transfer part connected to an end portion of the slider, and wherein the slider is moved in the direction opposite to the first direction when the operation part is operated, the movement mechanism moving the holder and the disk cartridge from the read/write position to the insertion position in response to the movement of the slider, so that the disk cartridge can be ejected from the holder at the insertion position.

According to the present invention, it is possible to stably and easily eject the disk cartridge from the disk storage device because the eject member is mounted flat on the upper portion of the frame and the eject member has the operation part formed substantially parallel to the surface of the turntable. The disk cartridge ejected from the device does not interfere with the operator's finger due to the location and construction of the eject member. The possibility that data stored in the disk is damaged due to erroneous operation of the eject member is remarkably reduced. According to the present invention, the eject member is provided with projections extending sideways from the transfer part, the distance between the outside edges of the projections being greater the transverse width between the inside edges of the opening in the upper portion of the frame. Thus, it is possible to prevent the eject member from being easily disconnected from the mounting portion of the device even when an external force is applied to the eject member in such a direction as to separate it from the mounting portion.

Other objects and further features of the present invention will become more apparent from the following detailed description when read in conjunction with the accompanying drawings.

BRIEF DESCRIPTION OF THE DRAWINGS

FIGS. 2A, 2B and 2C are side, top and front views of a first embodiment of a disk storage device according to the present invention;

DESCRIPTION OF THE PREFERRED EMBODIMENTS

Figure 1:
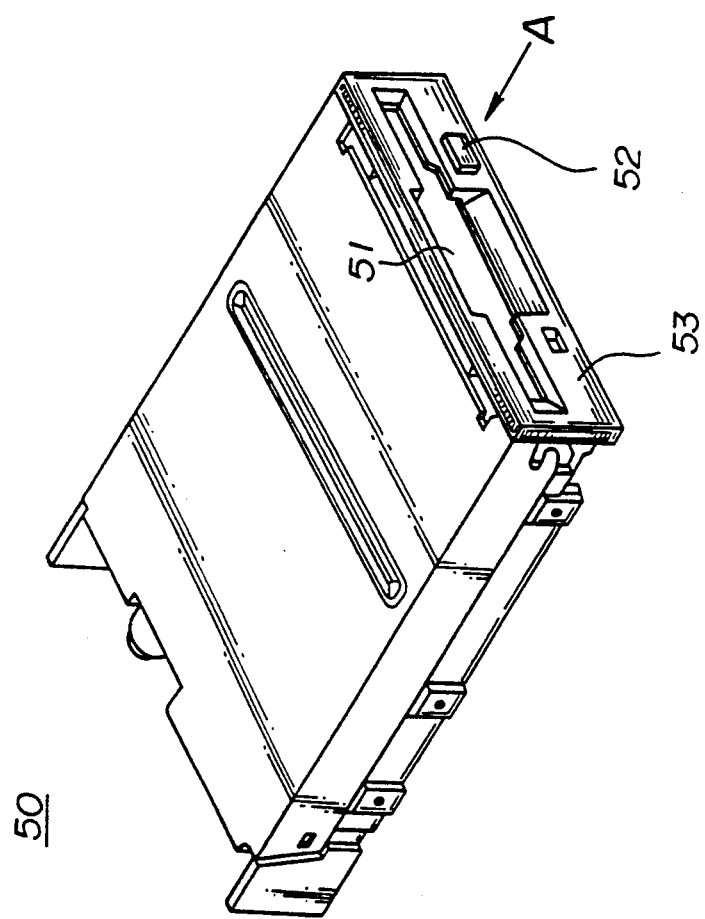
FIG. 1 is a perspective view showing a disk storage device according to the prior art.

First, a description will be given, with reference to FIGS. 2A through 2C, of a first embodiment of a disk storage device according to the present invention. In the disk storage device, a storage disk accommodated in a disk cartridge 4 is inserted into the disk storage device through an insertion opening 31 in a front end surface in a direction indicated by an arrow X. The disk storage device includes a head part for writing data to the storage disk and reading data from the storage disk. The storage disk is then placed at a read/write position on a turntable within the disk storage device, so that data is written to and read from the storage disk by the head part. The storage disk is one of several types of storage disks such as a magnetic disk, a magneto-optic disk or an optical disk.

In the disk storage device shown in FIGS. 2A through 2C, there are provided a turntable for rotating and driving a storage disk thereon to perform data recording and reproducing with the head part, a holder for holding a disk cartridge containing the disk and placing the disk at the read/write position so as to fit the center hole of the disk onto the spindle of the turntable, and a slider being disconnected from a latch lever when the disk cartridge is loaded, and moved in a direction parallel to the direction of insertion of the disk cartridge so as to place the disk at the read/write position on the turntable in cooperation with the disk cartridge inserted in the disk storage device. When the slider is moved in cooperation with the disk cartridge, the holder is moved toward the turntable so that the disk in the holder is placed at the read/write position on the turntable.

In the disk storage device according to the present invention, an eject member 30 is mounted flat on a top surface 33 of the frame 2. The slider described above is connected to the eject member 30. When the eject member 30 is moved by a user in a direction X shown in FIG. 2B, the slider, connected to the eject member 30, is moved so as to separate the holder from the turntable. The disk accommodated in the disk cartridge within the holder is thus separated from the read/write position on the turntable, and the disk cartridge is ejected by an eject lever from the insertion opening 31 in a direction Y opposite to the direction X shown in FIG. 2B.

Figure 3:
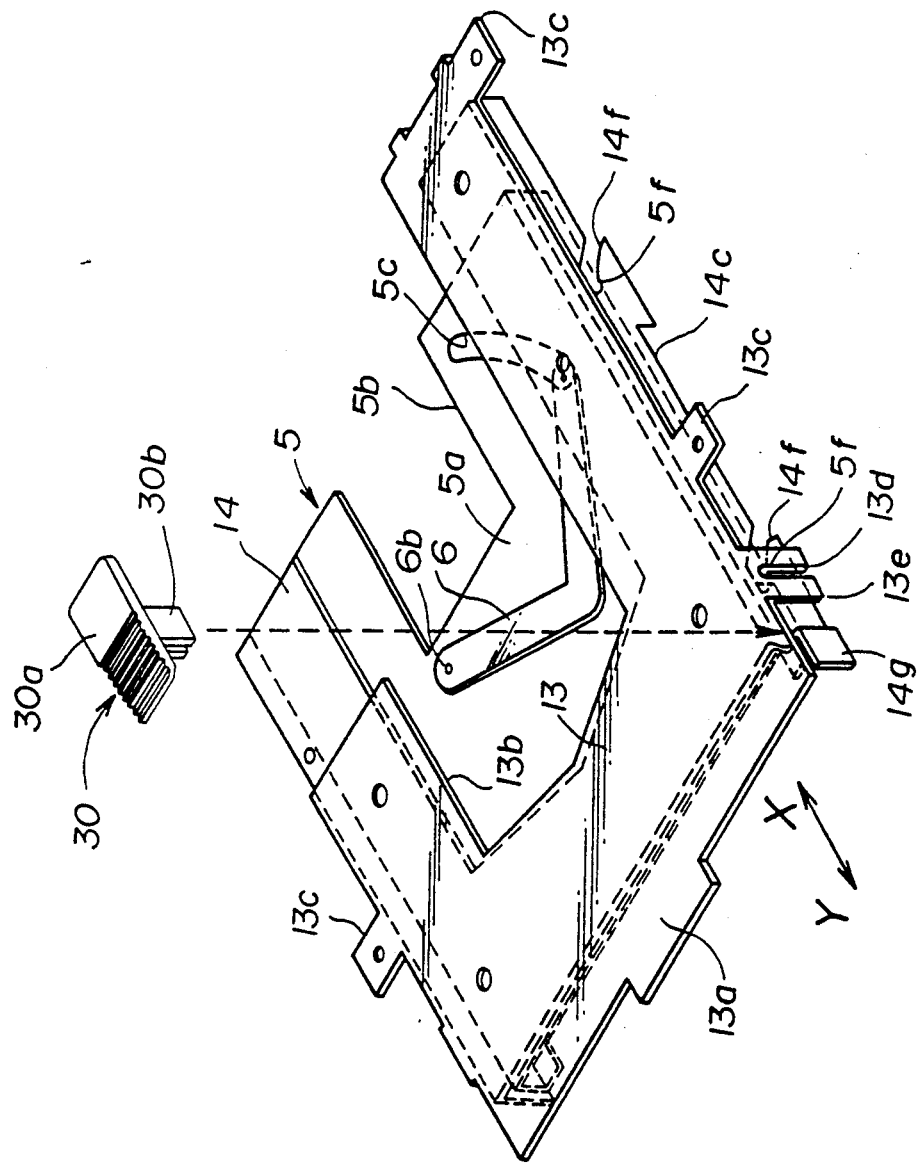
FIG. 3 is a perspective view showing a cover member, a slider, and a holder provided in the disk storage device shown in FIGS. 2A through 2C.
Figure 4:
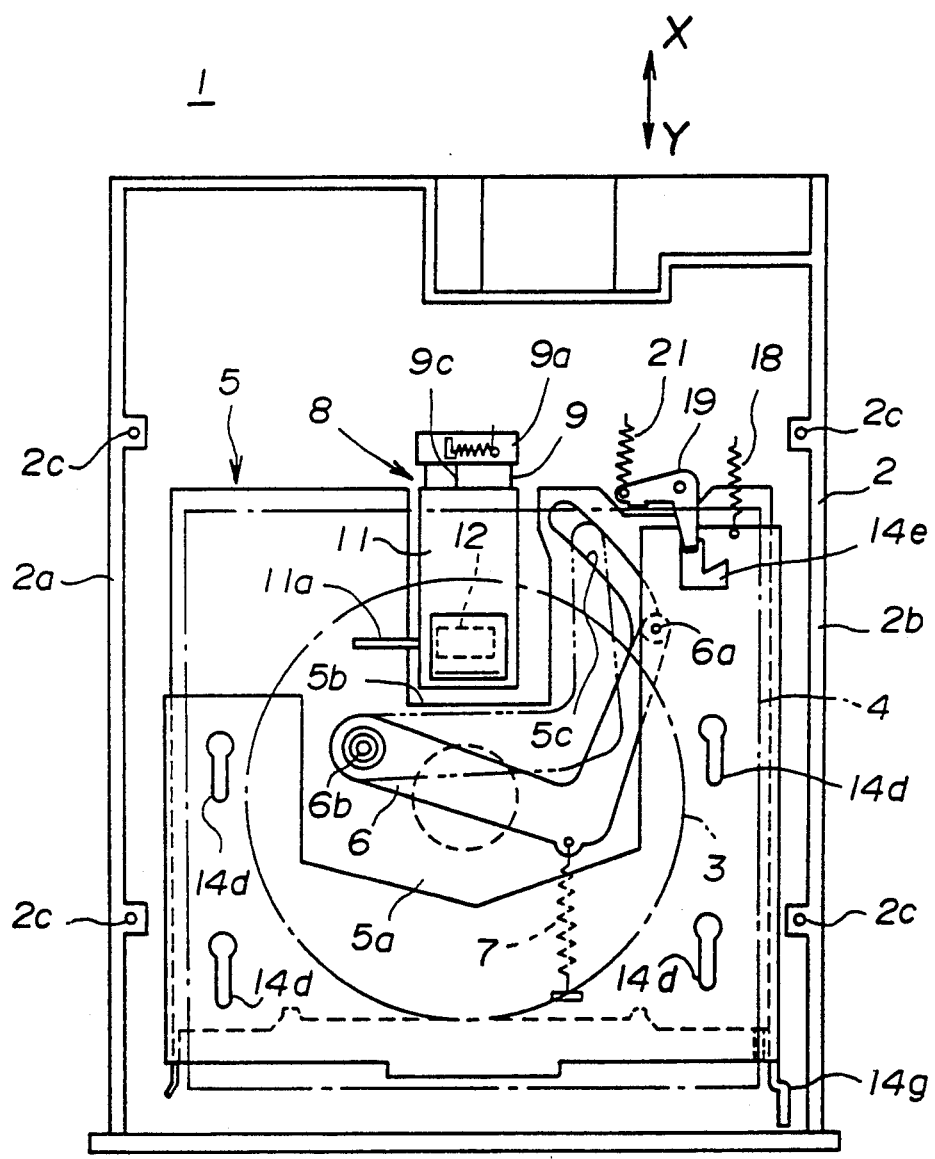
FIG. 4 is a top view showing the internal structure of the disk storage device shown in FIGS. 2A through 2C.

FIGS. 3 through 7 show the internal structure of the disk storage device according to the present invention. In these drawings, a disk storage device 1 according to the present invention is illustrated. In this disk storage device, data is written to and read from a magnetic disk by means of the head part. The disk storage device 1 includes a frame 2 and a holder 5 provided on the frame 2 for holding a disk cartridge 4 containing a magnetic disk 3 which is inserted into the disk storage device 1. In FIG. 4, the disk cartridge 4 is indicated by a phantom line (one-dot chain line), and a cover member (which will be described below) has been removed from the disk storage device 1.

The holder 5 is arranged in the disk storage device so that the holder 5 is raised relatively thereon when the disk cartridge 4 is inserted into the disk storage device. The holder 5 has an upper portion 5a with a rectangular opening 5b. A head part 8 is moved within the opening 5b of the holder 5 relative to the magnetic disk 3 in the radial direction of the magnetic disk 3. An L-shaped shutter lever 6 is pivotably supported on the upper portion 5a by a pin 6b, and this shutter lever 6 has a downwardly protruding connecting pin 6a at the other end thereof. The upper portion 5a has an arc-like hole 5c at a location corresponding to the connecting pin 6a, and the connecting pin 6a protrudes downwardly from the hole 5c to the inside of the holder 5. Upon insertion of the disk cartridge 4 in the disk storage device, the connecting pin 6a of the lever 6 is engaged with a shutter part (not shown) of the disk cartridge 4 so that the shutter part is opened. A coil spring 7 is fixed at one end to the upper portion 5a, and is connected at the other end to an intermediate portion of the L-shaped lever 6 to draw the lever 6 clockwise (in such a direction as to close the shutter part) due to the pulling force of the spring 7.

Figure 7:
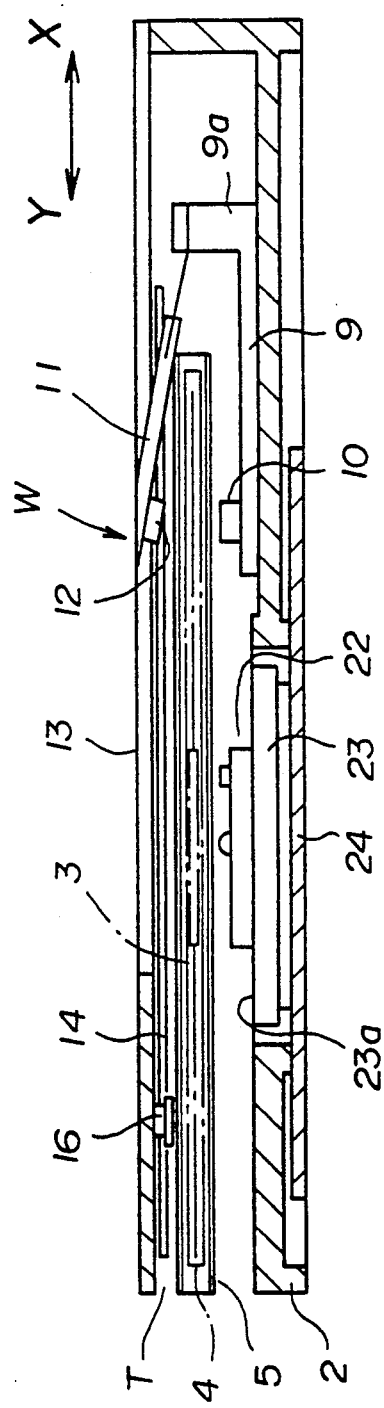
FIG. 7 is a sectional view showing the side of the disk storage device before the disk cartridge is inserted.

As shown in FIGS. 4 and 7, the head part 8 includes a carriage 9 arranged to be movable in the radial directions X and Y of the disk 3, a lower magnetic head 10 mounted on top of an end portion of the carriage 9, an arm 11 rotatably supported on a base portion 9a of the carriage 9, and an upper magnetic head 12 mounted on the bottom of an end portion of the arm 11. The carriage 9 is engaged with a lead screw (not shown) which is rotated by a stepping motor (not shown). Thus, the carriage 9 is moved on the frame 2 in the radial directions X and Y of the disk 3 in accordance with the rotation of the lead screw, so that the upper and lower magnetic heads 10 and 12 are moved with the carriage 9 relative to the magnetic disk 3 in the radial directions to accomplish data recording and reproducing with the magnetic disk 3.

The arm 11 is drawn in a direction indicated by an arrow W in FIG. 7, by the depressing force of a torsion spring 9c mounted on the base portion 9a of the carriage 9 as shown in FIG. 4. A connecting portion 11a protrudes sideways from the side of the arm 11, and the upper portion 5a of the holder 5 touches the connecting portion 11a. Before the disk cartridge 4 is inserted in the disk storage device, the holder 5 is raised to an insertion position and the arm 11 is placed at a higher position, so that the upper magnetic head 12 is separated from the lower magnetic head 10.

Figure 8:
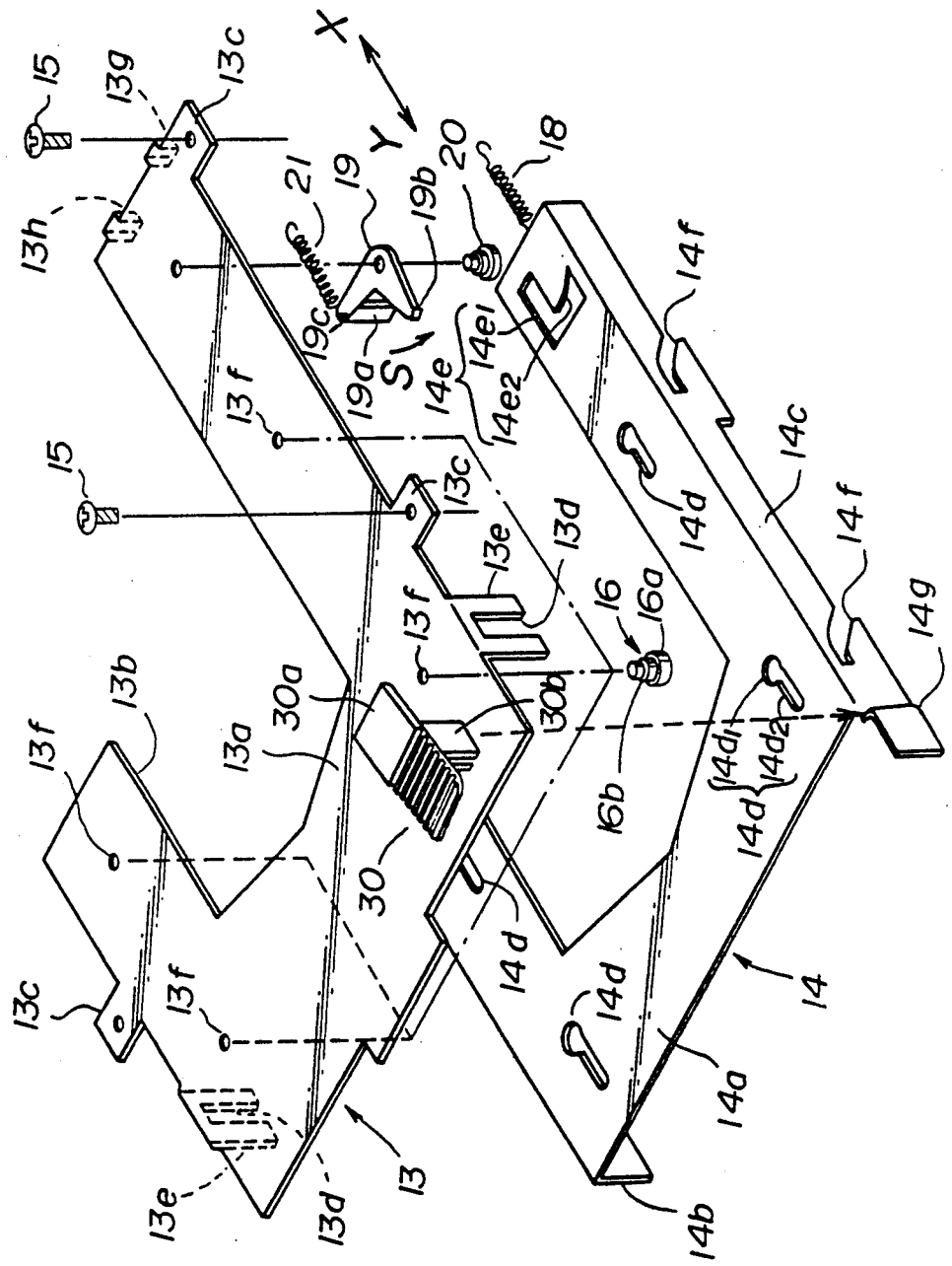
FIG. 8 is a perspective view showing the cover member and the slider of the disk storage device shown in FIGS. 2A through 2C.

A cover member 13 is secured to the frame 2 by screws which are fitted in threaded holes 2c formed at peripheral portions 2a and 2b of the frame 2. The top surface of the holder 5 is covered by this cover member 13 when it is mounted. As shown in FIG. 8, the cover member 13 includes a J-shaped main part 13a, a cut-out opening 13b in which the shutter lever 6 is placed, a set of mounting portions 13c protruding sideways from the main part 13a and having openings through which machine screws for mounting the cover member are inserted, and a set of downwardly protruding guide portions 13e with guide grooves 13d. A set of pins 5f protruding sideways from the side portions 5d and 5e of the holder 5 are fitted in the guide grooves 13d of the guide portions 13e of the cover member 13, so that the pins 5f of the holder 5 are guided in the grooves 13d when the holder 5 is raised and lowered by the disk cartridge being loaded in and unloaded from the disk storage device.

The slider 14, as shown in FIG. 8, is provided between the upper portion 5a of the holder 5 and the cover member 13. The slider 14 includes a U-shaped upper portion 14a, and a pair of side portions 14b and 14c protruding downwardly from the upper portion 14a. The upper portion 14a has four slots 14d extending in the directions X and Y. A set of guide pins 16 which are respectively embedded in a set of holes 13f formed in the main portion 13a of the cover member 13 are placed in the slots 14d of the slider 14. Each of the guide pins 16 has a large-diameter portion 16a and a small-diameter portion 16b. Each of the slots 14d has a circular opening 14d1 through which the large-diameter portion 16a is passed, and a narrow opening 14d2 in which the small-diameter portion 16b is slidably fitted. Thus, the slider 14 can be moved in the directions X and Y and is slidably supported by the guide pins 16 downwardly protruding from the cover member 13.

At a rear portion of the upper portion 14a of the slider 14, an L-shaped connecting hole 14e is formed as shown in FIG. 8. This connecting hole 14e has a longitudinal opening 14e1 extending in the directions X and Y and a transverse opening 14e2 extending at right angles to the longitudinal opening 14e1. Each of the side portions 14b and 14c of the slider 14 has a pair of inclined grooves 14f, and the pins 5f protruding sideways from the holder 5 are fitted in the grooves 14f. At a front end portion of the side portion 14c of the slider 14, a mounting portion 14g is provided as shown in FIGS. 3, 4 and 8. The eject member 30 according to the present invention is attached to the mounting portion 14g. As shown in FIG. 4, the mounting portion 14g has an L-shape when viewed from top.

A compression spring 18, shown in FIGS. 4 and 8, is provided to press the slider 14 back in the direction Y. One end of the spring 18 is connected to a rear end portion of the slider 14, and the other end of the slider 14 is connected to a portion 13g downwardly protruding from the rear end of the cover member 13. The slider 14 is moved in the direction Y due to the pressing force of the spring 18 before the disk cartridge 4 is loaded in the disk storage device. When the disk cartridge is ejected from the device, the slider 14 is moved in the direction X in cooperation with the eject member 30.

The eject lever 19, shown in FIGS. 4 and 8, is pivotably supported on the cover member 13 by a pin 20 embedded in the cover member 13. The eject lever 19 includes a contact surface 19a with which the disk cartridge 4 comes into contact, a downwardly protruding connecting rib 19b connected to the hole 14e of the slider 14, and a connecting portion 19c to which a compression spring 21 is connected at one end. The compression spring 21 is provided to press or rotate the eject lever 19 anticlockwise in the direction indicated by an arrow S in FIG. 8. The other end of the spring 21 is connected to a connecting portion 13h downwardly protruding from the end of the cover member 13. When the slider 14 is moved in the direction X with the disk cartridge 4 being ejected, the eject lever 19 is rotated in the direction S to bring the rib 19b into contact with the transverse opening 14e2 of the hole 14e so that the eject lever 19 is engaged with the slider 14.

As described above, the slider 14, the eject lever 19, the compression springs 18 and 21, and other parts are assembled on the cover member 13 shown in FIG. 8. It is possible to assemble these parts with the cover member before the assembly process of the disk storage device is conducted. Thus, by preparing such an assembly of the cover member 13 and those parts, the assembly process of the disk storage device can be performed efficiently, and the disk storage device can be assembled in a shorter time than that of the conventional case.

Figure 6:
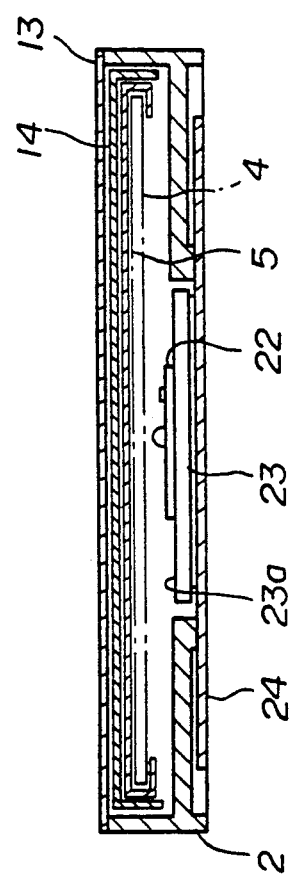
FIG. 6 is a sectional view showing the front of the disk storage device before the disk cartridge is inserted.

As shown in FIGS. 6 and 7, the holder 5 is raised to the insertion position before the disk cartridge 4 is inserted. The arm 11 having the portion 11a connected to the upper portion 5a of the holder 5 is also raised to a higher position. Thus, it is necessary that a space T wherein the arm 11 can be rotated upward is provided between the holder 5 and the cover member 13. The slider 14 is provided between the holder 5 and the cover member 13 such that the slider 14 is placed within this space T. In the conventional disk storage device, the space T is used only by the upper magnetic head 12 mounted on the arm 11 to move upward, and is not used by the other parts. In the above described embodiment, the slider 14 is placed within the space T, and it is possible for the insertion position of the holder 5 relative to the frame 2 to be lower than the corresponding position of the conventional case, thus enabling the disk storage device to have a smaller thickness. Also, the guide pins 16 for guiding the movement of the slider 14 have a length protruding from the cover member 13, between the holder 5 and the cover member 13, which is similar to that of the conventional device. Thus, it is possible to prevent the slider 14 from disconnecting from the guide pins 16, and the slider 14 can be stably guided by the guide pins 16 when it is moved.

Figure 5:
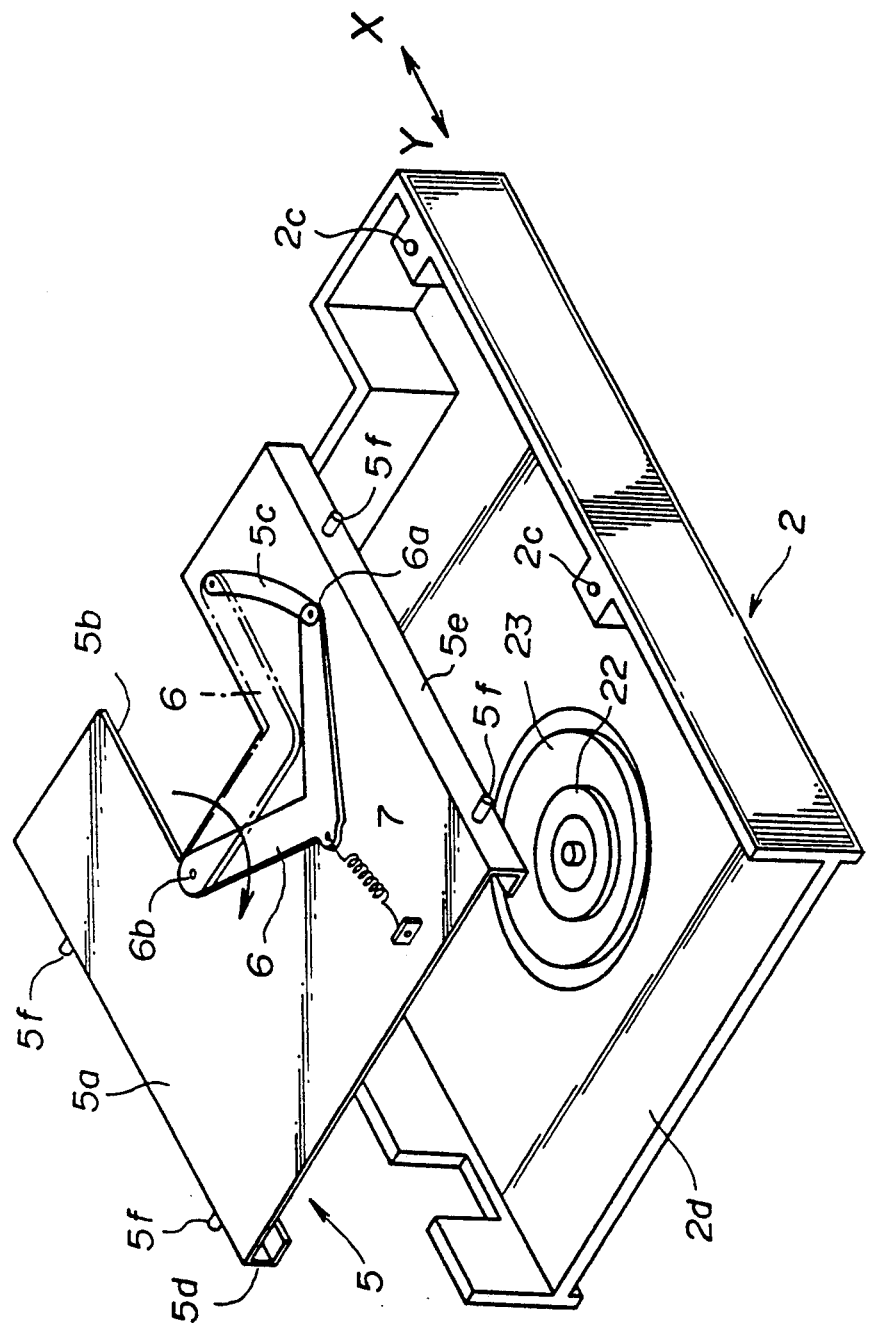
FIG. 5 is a perspective view showing the holder and a frame of the disk storage device shown in FIGS. 2A through 2C.

The turntable 22, shown in FIG. 5, on which the center hole of the magnetic disk 3 in the disk cartridge 4 is placed, is rotated at a constant rate by a driving motor 23. The driving motor 23 is arranged in a circuit board 24 (shown in FIGS. 6 and 7) mounted on a bottom surface of the frame 2. The driving motor 23 has a driving coil (not shown) on the circuit board 24 and a rotor 23a on which the turntable 22 is mounted. This structure of the driving motor 23 is intended for making the disk storage device portable and thin.

Figure 11A:
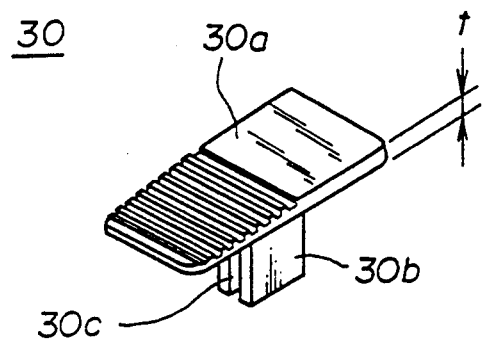
FIGS. 11A and 11B are perspective views showing the top and bottom of an eject member mounted on the disk storage device shown in FIG. 8.
Figure 11B:
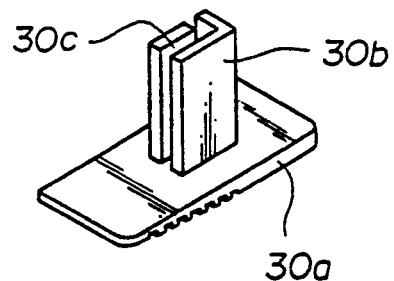

FIGS. 11A and 11B are perspective views showing the top and bottom portions of the eject member 30. The eject member 30 is made of synthetic resin, and it includes a generally rectangular operation part 30a with a maximum thickness t at a rear-side end portion thereof, and a transfer part 30b protruding downward from the bottom of the operation part 30a and having a fitting groove 30c with an L-shaped cross section. This groove 30c having the L-shaped cross section is fitted on the L-shaped mounting portion 14g of the slider 14. The front half of the operation part 30a is formed like a wedge so as to have a gradually decreasing thickness from at the middle of the part 30a to the front edge thereof. Throughout the front half of the operation part 30a, a plurality of small ribs and grooves are formed so that the eject member 30 can securely engage with the operator's finger.

The eject member 30, as shown in FIGS. 3 and 8, is firmly secured to the slider 14 in a manner such that the groove 30c of the transfer part 30b is fitted on the mounting portion 14g at the end portion of the slider 14, and such that the operation part 30a is mounted flat on the top of the frame 2 in a state parallel to the surface of the turntable 22. The transfer part 30b of the eject member 30 with the L-shaped groove 30c has a transverse surface touching the mounting portion 14g, which surface is perpendicular to the directions X and Y of the movement of the eject member when it is moved in the direction X by the operator. The movement of the eject member 30 can be reliably transferred to the slider 14 due to the above mentioned structure of the eject member 30. In addition, the transfer part 30b of the eject member 30 is not easily disconnected from the mounting portion 14g of the slider 14 when the eject member 30 is operated by the operator.

The disk storage device according to the present invention in a completely assembled state is shown in FIGS. 2A through 2C. As shown, the operation part 30a of the eject member 30 is mounted flat on the top surface 33 of the frame 2, which surface is substantially parallel to the surface of the turntable 22 of the disk storage device. More specifically, the top surface 33 of the frame 2 has a slide portion 33a at a right-hand front corner thereof, which portion is surrounded by an upwardly protruding peripheral portion 33b, and the operation part 30a of the eject member 30 is placed flat at the slide portion 33a of the frame top surface 33, and it is surrounded by the upwardly protruding peripheral portion 33b. The slide portion 33a of the eject member 30 has a longitudinal length enough to move the operation part 30a in the directions X and Y when the disk cartridge 4 is loaded and unloaded. The position to which the operation part 30a is moved back in the direction Y when the disk cartridge 4 is loaded in the disk storage device is indicated by a dotted line in FIG. 2B. In addition, the slide portion 33a of the frame top surface 33 has a through hole (not shown) through which the transfer part 30b of the eject member 30 is passed. The through hole of the slide portion 33a has a transverse width slightly greater than the width of the transfer part 30b, and a longitudinal length greater than the sum of the longitudinal length of the transfer part 30b and the distance of the X-Y movement of the slider 14. Therefore, when the operation part 30a of the eject member 30 is moved by the operator in the X-Y direction, the slider 14 can be smoothly moved in cooperation with the eject member 30.

The operation part 30a of the eject member 30 shown in FIG. 2B has a top surface different from that of the operation part 30a shown in FIGS. 3, 8 and 11. However, both the operation parts 30a have a similar effect. In the operation part 30a shown in FIGS. 2B and 2C, the rear half of the operation part 30a is formed like a wedge so as to have a gradually increasing thickness from the middle of the part 30a to the rear edge thereof. Throughout the rear half of the operation part 30a, a plurality of small ribs and grooves are formed. On the front half of the operation part 30a, four curved portions are formed in a continuous manner. Thus, similarly to the operation part 30a shown in FIGS. 3, 8 and 11, the eject member 30 with the operation part 30a shown in FIG. 2B can securely engage with the operator's finger. The above described structure of the eject member 30 prevents the operation part 30a from erroneously being moved when an object is placed on the top surface 33 of the disk storage device or when someone touches the disk storage device by mistake.

As described in the foregoing, the operation part 30a of the eject member 30 has a flat structure. Although it is necessary that the operation part 30a has a surface area large enough for the operator's finger to touch the operation part 30a with ease, the operation part 30a can be formed with a small thickness as far as there is no problem with the strength of the eject member 30. By contrast, in the conventional disk storage device, it is necessary that the eject member 51 has a relatively large front end surface area such that the eject member 51 is reliably depressed by the operator's finger. In the disk storage device according to the present invention, however, the operation part 30a of the eject member 30 can be formed with a small thickness. Therefore, it is not necessary to take into consideration the thickness of the eject member when the overall thickness of the disk storage device according to the present invention is determined. This will promote a more easily accomplished design and manufacture of a disk storage device having the mechanism for making the disk storage device portable and thin.

In the disk storage device having the above described eject member provided on the top of the frame top surface, the operator can stably and easily move the eject member when the disk storage device is used by placing it on a surface of a table. When the disk cartridge is ejected from the device by means of the eject member, the disk cartridge does not interfere with the operator's finger, and the disk cartridge can be safely and easily ejected from the disk storage device. The possibility of erroneous operation to eject the disk cartridge from the disk storage device by means of the eject member is remarkably reduced, thus preventing data stored in the disk from being damaged during the data writing operation of the disk storage device.

Next, a description will be given of the operation of the above described disk storage device having the eject member according to the present invention. The condition of the disk storage device before the disk cartridge 4 is loaded therein is shown in FIGS. 6 and 7. In this condition, the slider 14 has been moved in the direction X and placed at the rearmost position thereof, and the arm 11 having the upper magnetic head 12 has been raised to a higher position together with the holder 5. The holder 5 is located at the insertion position.

The position of the disk cartridge 4 at the time when it has just been inserted into the holder 5 of the disk storage device is indicated by a phantom line (one-dot chain line) in FIGS. 4, 6 and 7. The leading edge of the disk cartridge 4 is moved in the direction X so that it is brought into contact with the portion 19a of the eject lever 19. As the disk cartridge 4 is further moved in the direction X against the pressing force of the spring 21, the eject lever 19 is rotated clockwise so that the connecting portion 19b of the lever 19 is moved from the opening 14e2 of the connecting hole 14e to the opening 14e1. Then, the slider 14 is disconnected from the eject lever 19, and it is moved in the direction Y due to the pressing force of the compression spring 18. As the slider 14 is supported by the four guide pins 16 during the movement, it is stably moved in the direction Y.

Figure 9:
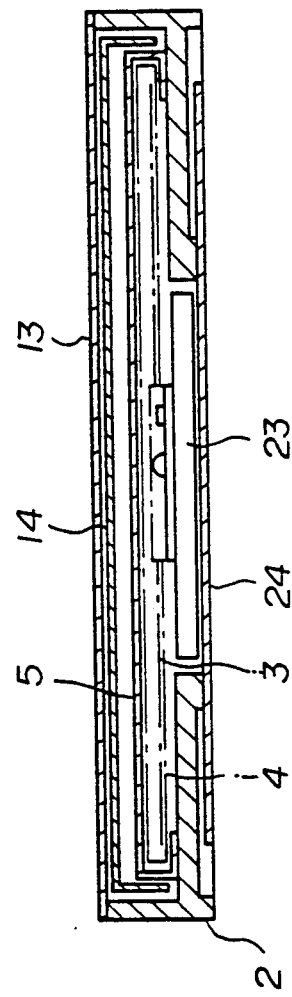
FIG. 9 is a sectional view showing the front of the disk storage device after the disk cartridge is inserted therein.
Figure 10:
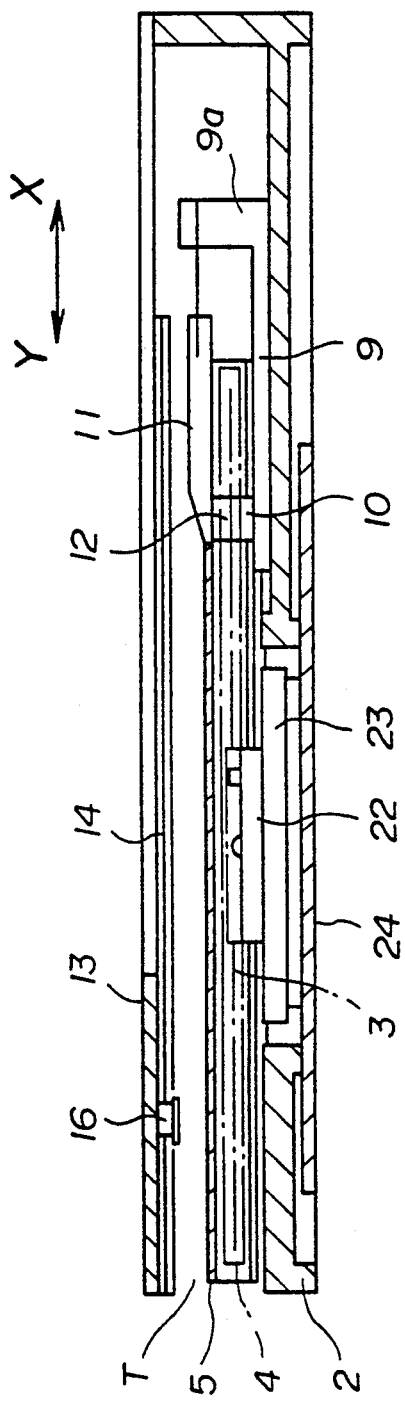
FIG. 10 is a sectional view showing the side of the disk storage device after the disk cartridge is inserted therein.

As the pins 5f protruding sideways from the holder 5 are connected to the inclined grooves 14f of the side portions 14b and 14c of the slider 14, the pins 5f of the holder 5 are guided along the inclined grooves 14f of the slider 14 and pressed downward when the slider is moved in the direction Y. Thus, the holder 5 is lowered to the read/write position where the magnetic disk 3 accommodated in the disk cartridge 4 is placed on the turntable 22, this read/write position of the holder 5 shown in FIGS. 9 and 10. When the holder 5 is placed at the read/write position, the center hole of the magnetic disk 3 is fitted on the spindle of the turntable 22.

When the holder 5 is lowered to the read/write position, the arm 11 having the portion 11a connected to the holder 5 is rotated anticlockwise with the help of the pressing force of the torsion spring 9c, so that the upper magnetic head 12 is lowered relative to the frame 2. When the disk cartridge 4 is inserted into the holder 5, the shutter (not shown) of the disk cartridge 4 is opened by the pin 16a due to the anticlockwise rotation, so that the disk storage device has access to the magnetic disk 3 accommodated in the disk cartridge 4. Hence, after the disk cartridge 4 is placed in the holder 5 and the holder 5 is lowered, the center hole of the magnetic disk 3 is placed on the spindle of the turntable 22, and at the same time the upper and lower magnetic heads 12 and 10 are brought into contact with upper and lower recording surfaces of the magnetic disk 3.

When the turntable 22 is rotated by the driving motor 23, the magnetic disk 3 is rotated together with the turntable 22, so that data is written to or read from the magnetic disk 3 by means of the upper and lower magnetic heads 12 and 10.

When the disk storage device in which the disk cartridge 4 is loaded is not performing a read/write operation, an operator can operate the eject member 30 on top of the disk storage device to move the operation part 30a of the eject member 30 in the direction X. The slider 14 is moved in the direction X together with the eject member 30, so that the holder 5 is raised back to the insertion position. The movement of the slider 14 in the direction X enables the eject lever 19 to rotate in the direction S (anticlockwise) due to the pressing force of the compression spring 21. The portion 19b of the eject lever 19 is moved and connected to the opening 14e2 of the L-shaped hole 14. At the same time, the portion 19a of the eject lever 19, when it is rotated in the direction S, presses the disk cartridge 4 in the holder 5 toward the insertion opening 31, so that the disk cartridge 4 is moved in the direction Y and it is thus ejected from the disk storage device.

In the above described embodiment, the disk storage device deals with the magnetic disk. However, it is possible that the disk storage device of the present invention is applied to a mechanism dealing with a magneto-optic disk or an optical disk. Also, the internal structure of the disk storage device of the above embodiment has the mechanism described above. However, it is possible to use another mechanism which accomplishes the same effects and functions as those of the above described embodiment.

Next, a description will be given, with reference to FIGS. 14 through 18, of a second embodiment of the disk storage device according to the present invention. This embodiment includes another mechanism for preventing an eject member from being easily disconnected from the frame of the disk storage device when an external force is applied to the eject member in such a direction as to disconnect the eject member.

FIGS. 14A through 14D show the structure of an eject member 70 of the second embodiment, the eject member 70 being provided on the disk storage device for ejecting a disk cartridge from the disk storage device, whose function is essentially the same as that of the eject member 30 of the first embodiment described above.

The eject member 70 is made of synthetic resin and formed through integral molding of synthetic resin. The eject member 70 includes a generally rectangular operation part 71 which is moved by an operator, and a transfer part 72 extending downward from the bottom of the operation part 71.

Figure 14A:
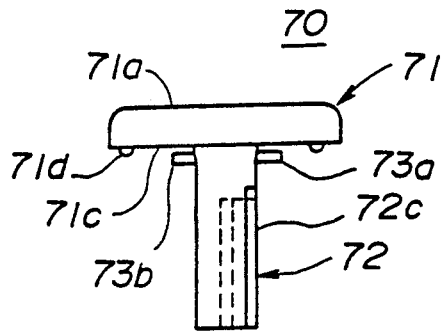
FIGS. 14A through 14D are views showing the structure of the eject member shown in FIGS. 12A and 12B.
Figure 14B:
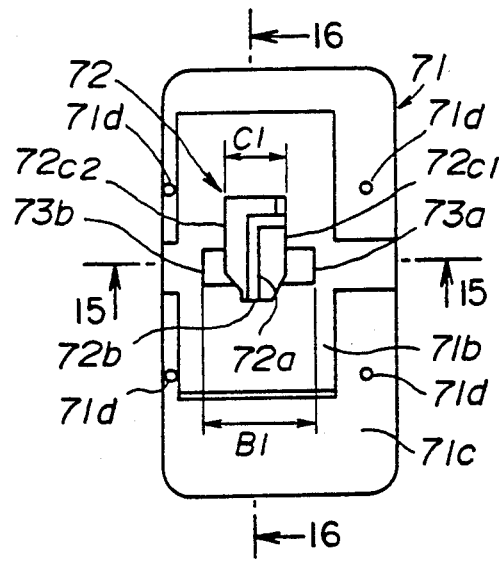
Figure 14D:
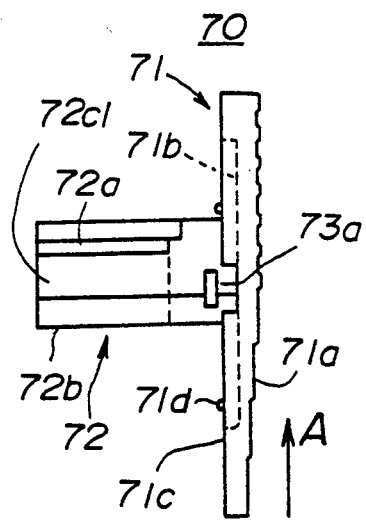
Figure 14C:
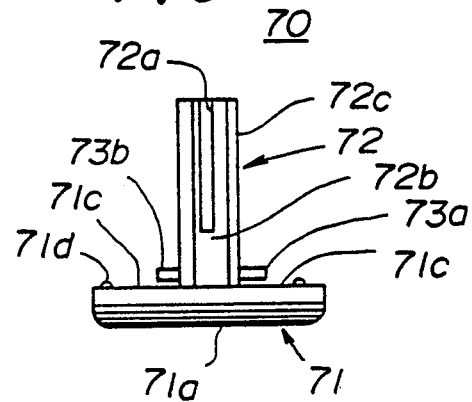
Figure 15:
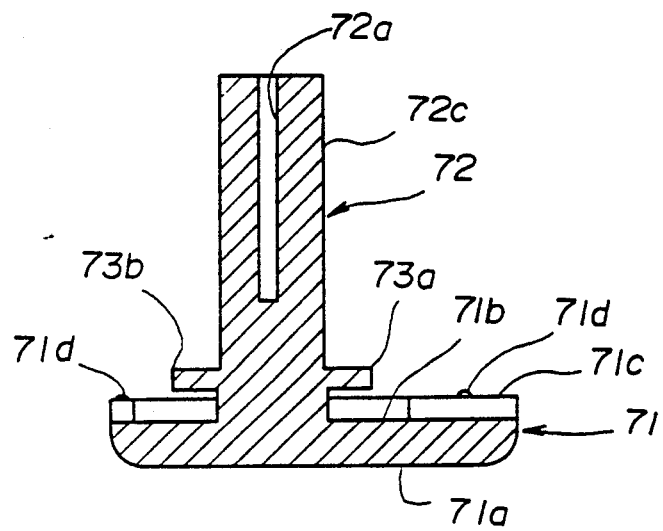
FIG. 15 is a sectional view of the eject member taken along a line 15—15 shown in FIG. 14B.
Figure 16:
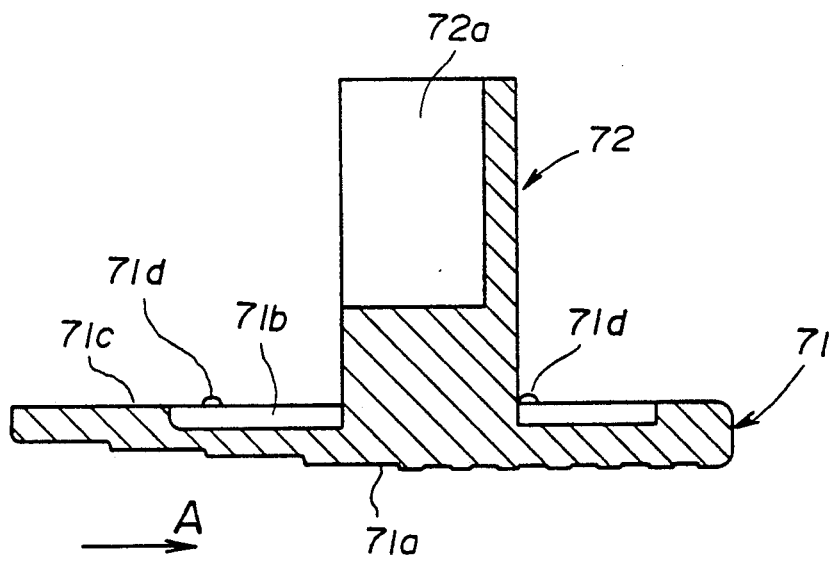
FIG. 16 is a sectional view of the eject member taken along a line 16—16 in FIG. 14B.

The operation part 71 has an operation surface 71a on a top side thereof. As shown in FIGS. 14D and 16, this operation surface 71a includes a rear-side half portion with a set of small ribs and grooves and a front-side half portion with a set of gradually raised steps merging with the ribs and grooves of the rear-side half portion. An operator of the disk storage device can easily move the eject member 70 in the direction indicated by an arrow A in FIG. 14D because the operation part 71 of the eject member has the above mentioned operation surface 71a. The operation part 71 has a rectangular recess 71b on the bottom side thereof wherein the transfer part 72 is provided, and a bottom surface 71c which is the remaining bottom surface area different from the recess 71b. Also, four projections 71d (which will be described below in detail) are formed on the bottom surface 71c of the operation part 71.

The transfer part 72 of the eject member 70 extends downward from the middle of the recess 71b on the bottom of the operation part 71. The transfer part 72, as shown in FIG. 14B, includes a mounting groove 72a, a front face 72b, a right-hand side face 72c1, and a left-hand side face 72c2. The mounting groove 72a has an L-shaped cross section connecting the front face 72b to the right-hand side face 72c1. The mounting groove 72 is formed with a predetermined depth measured from the lowermost point of the transfer part 72.

The eject member 70 is mounted at the mounting portion 14f of the slider 14 in a manner similar to that of the first embodiment as shown in FIG. 3. The L-shaped mounting portion 14g of the slider 14 is fitted in the mounting groove 72a of the eject member 70. Thus, an external force applied to the operation part 71 of the eject member 70 is transferred to the slider 14 by the transfer part 72.

The eject member 70 further includes a pair of rectangular projections 73a and 73b extending sideways from the side faces 72c1 and 72c2 of the transfer part 72 at a height slightly lower than the bottom of the operation part 71. The projections 73a and 73b are provided to prevent the eject member 70 from being easily disconnected from the disk storage device due to the external force, which will be described below in detail.

Figure 17:
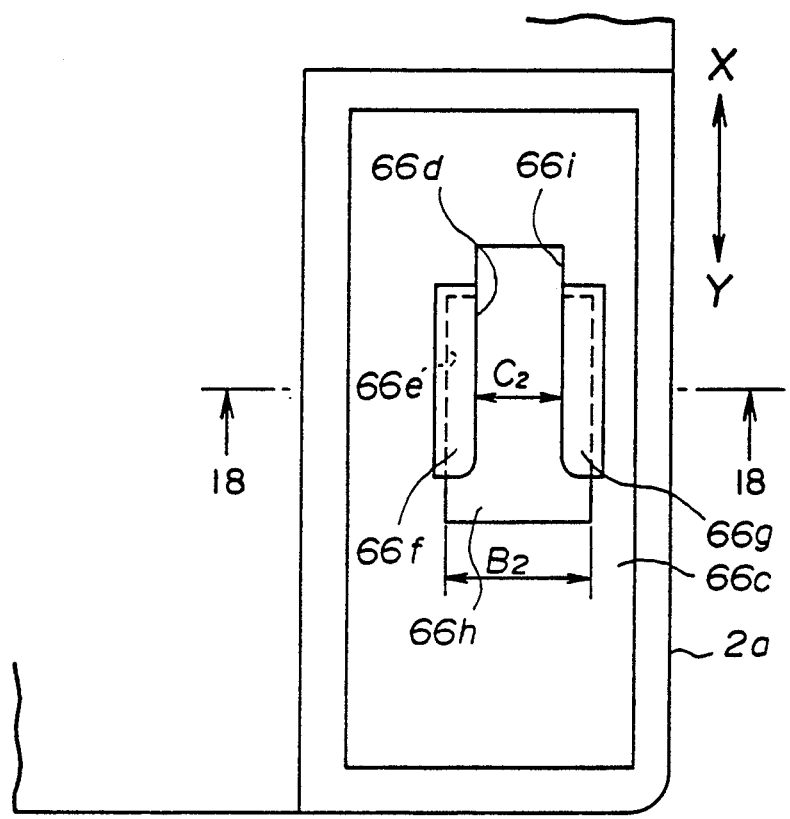
FIG. 17 is a top view showing a portion of the disk storage device at which the eject member is mounted.
Figure 18:
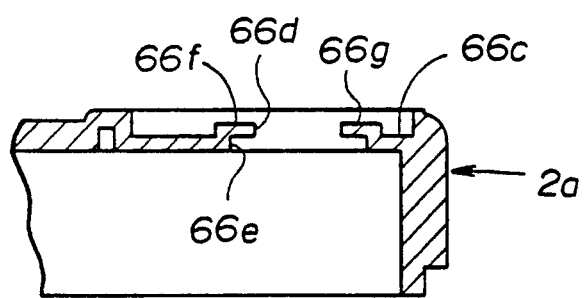
FIG. 18 is a sectional view of the portion of the frame of the disk storage device taken along a line 18—18 shown in FIG. 17.

FIGS. 17 and 18 show the structure of a mounting portion of the disk storage device on which the eject member described above is mounted. This mounting portion is located at the right-hand, front corner of the upper portion 2a of the frame 2.

In the mounting portion, shown in FIGS. 17 and 18, there are provided a rectangular recess 66c and a rectangular opening 66d formed in the middle of the recess 66c. The recess 66c is formed to cover the range in which the operation part 71 of the eject member 70 can be moved. The eject member 70 is mounted by inserting the transfer part 72 through the opening 66d. The opening 66d is formed with a lower rectangular opening 66e and a pair of connecting portions 66f and 66g extending inward from right and left peripheral edges of the lower opening 66e and being raised to higher positions over the lower opening 66e. The opening opening 66e has a transverse width B2 which is slightly greater than a distance B1 between the right and left edges of the projections 73a and 73b as in FIG. 14B. The transverse distance C2 between the inside edges of the connecting portions 66f and 66g shown in FIG. 17 is slightly greater than the width C1 of the transfer part 72 shown in FIG. 14B, and the distance C2 is smaller than the distance B1 between the right and left edges of the projections 73a and 73b of FIG. 14B (C1<C2<B1).

At the front end of the opening 66d, no connecting portions such as the connecting portions 66f and 66g are formed, and a front end opening 66h is formed with a transverse width equal to the width B2 of the lower opening 66e. The front end opening 66h merges with the lower opening 66e. Similarly, at the rear side end of the opening 66d, a rear end opening 66i is formed with a transverse width equal to the distance C2, and the rear end opening 66i merges with the lower opening 66e.

Figure 12A:
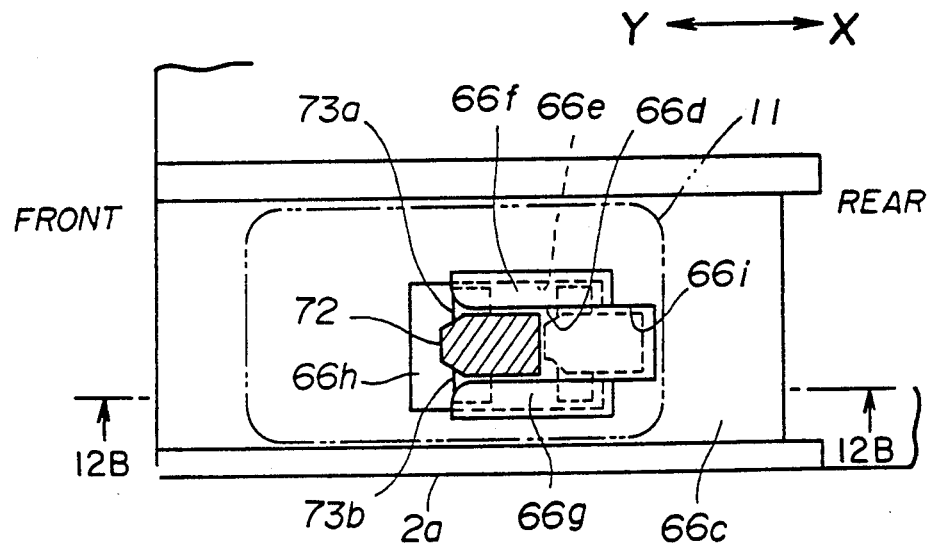
FIGS. 12A and 12B are top and side views showing the structure of another eject member mounted on a second embodiment of the disk storage device according to the present invention.
Figure 12B:
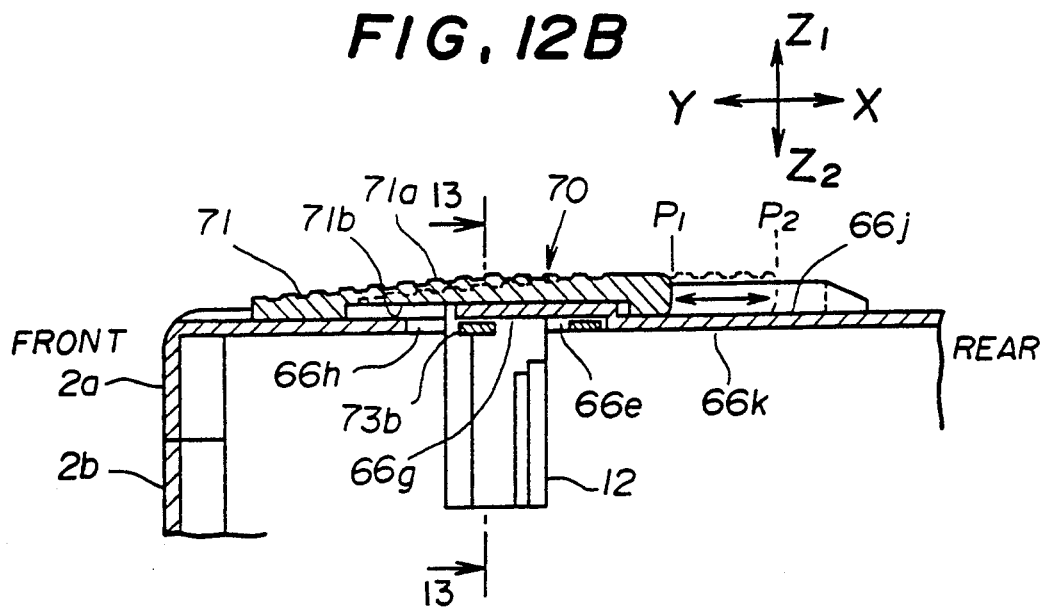
Figure 13:
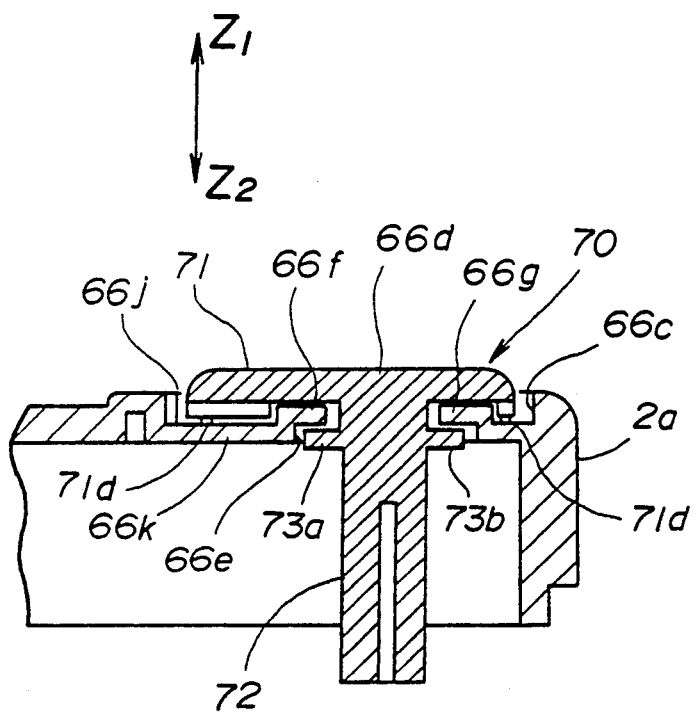
FIG. 13 is a sectional view of the eject member taken along a line 13—13 shown in FIG. 12B.

As shown in FIGS. 12A, 12B and 13, the eject member 70 is mounted on the upper portion 2a of the frame 2. More specifically, the operation part 71 of the eject member 70 is placed in the recess 66c of the upper portion 2a, and the four projections 71d of the operation part 71 come into contact with the bottom surface 66j of the recess 66c, so that the eject member 70 is supported on the projections 71d. The transfer part 72 (the width C1) of the eject member 70 is passed through the opening 66d (the width C2), and the projections 73a and 73b (the distance B1) of the eject member 70 are placed in the lower opening 66e (the width B2) while the connecting portions 66f and 66g are placed between the operation part 71 and the projections 73a and 73b.

A mounting procedure in which the eject member 70 is mounted on the upper portion 2a of the frame 2 will now be described. First, the transfer part 72 of the eject member 70 is placed into the opening 66h which is relatively wide in transverse direction, so that the projections 73a and 73b are located below the connecting portions 66f and 66g, and so that the transfer part 72 is passed through the opening 66. Then, the eject member 70 is moved relative to the upper portion 2a in the direction X without changing its vertical position, so that the eject member 70 can be placed at the position shown in FIGS. 12A, 12B and 13. As shown in FIG. 17, the projections 66f and 66g of this embodiment are rounded at front-side corners thereof, and therefore the transfer part 72 of the eject member 70 can be smoothly moved to the position of the opening 66d having the width C2.

In the course of the assembly of the disk storage device, the eject member 70 mounted on the upper portion 2a as described above is connected to the slider 14 inside the disk storage device. The mounting portion 14g of the slider 14 is fitted in the groove 72a of the transfer part 72 of the eject member 70 so that the eject member 70 is connected to the slider 14. The range from a point P1 to a point P2 on the upper portion 2a shown in FIG. 12B is the range in which the operation part 71 of the eject member 70 connected to the slider 14 can be moved in the directions X and Y. This movement range is determined depending on the range in which the slider 14 can be moved inside the disk storage device. In FIG. 12A, the position of the transfer part 72 corresponding to the point P1 of FIG. 12B is indicated by a solid line, and the position of the transfer part 72 corresponding to the point P2 of FIG. 12B is indicated by a dotted line. As shown in these drawings, when the operation part 71 is moved between the points P1 and P2 in the directions X and Y, the movement of the eject member 70 having the projections 73a and 73b is not restricted by the connecting portions 66f and 66g because the projections 73a and 73b are passed along the peripheries of the lower opening 66e. In addition, the openings 66d and 66i of the upper portion 2a are formed not to restrict the movement of the transfer part 72 of the eject member 70.

When an external force is applied by an operator to the operation part 71 of the eject member 70 in the direction X, the operation part 71 is moved from the point P1 to the point P2, so that the disk cartridge is ejected from the disk storage device as described above. Although the external force is usually applied to the operation part 71 in a depressing direction Z2 also, the eject member 70 of this embodiment is supported by the projections 71d of the operation part 71 coming into contact with the bottom surface 66j of the upper portion 2a. The frictional force during the movement of the operation part 71 is reduced to a relatively small level, and the eject member 70 of this embodiment can be smoothly operated.

In the above described embodiment, even if an external force is applied to the eject member 70 in a direction Z1 to separate the eject member 70 from the disk storage device in a case where the device is placed upside down or in a case where the eject member touches an external object, it is possible to prevent the eject member from being easily separated from the device. The eject member 70 is formed with the projections 73a and 73b extending sideways from the transfer part 72. The transverse distance B1 between the outside edges of the projections 73a and 73b is greater than the width C2 between the inside edges of the connecting portions 66f and 66g of the opening 66d (B1>C2). If the external force is applied in the direction Z1, the projections 73a and 73b are connected to the portions 66f and 66g to restrict the movement of the eject member 70 in the direction Z1.

In accordance with the above mounting procedure, the eject member 70 is mounted such that the transfer part 72 is secured to the slider 14. The eject member 70 after the above mounting procedure is restricted by the slider 14 inside the disk storage device, and the projections 73a and 73b are not moved from the opening 66d to the opening 66h in the direction Y due to the connection between the eject member 70 and the slider 14. Therefore, the projections 73a and 73b are always connected to the connecting portions 66f and 66g of the opening 66d when the eject member 70 is operated between the points P1 and P2, thus preventing the eject member 70 from being easily disconnected from the disk storage device.

In the second embodiment described above, the eject member 70 which is moved forward and backward in the directions X and Y on the upper portion of the frame is provided. However, it is possible that the present invention is applied to a mechanism in which the eject member is subjected to a rotating movement along the surface of the upper portion of the frame.

In the second embodiment described above, the projections extending sideways from the transfer part of the eject member are always connected to the connecting portions provided over the opening of the upper portion of the frame. Thus, it is possible to prevent the eject member from being easily disconnected from the disk storage device even if an external force is applied in a direction to separate the eject member from the device.

Further, the present invention is not limited to the disk storage device described above, but includes different types of disk storage devices such as magneto-optic storage devices and optical storage devices.

What is claimed is:

1. A disk storage device comprising:
  a head part for writing data to a storage disk inserted into the disk storage device and for reading data from the storage disk;
  an eject member which is operated when the storage disk is ejected from the disk storage device;
  a turntable for rotating and driving the storage disk thereon to perform data recording and reproducing in cooperation with the head part;
  a holder for holding a disk cartridge accommodating the storage disk, said holder placing the storage disk at a read/write position on the turntable, when the disk cartridge is inserted, by fitting a center hole of the storage disk on a spindle of the turntable;
  a slider which is disconnected from a latch lever when the disk cartridge is inserted, and is moved in a first direction substantially parallel to a direction of insertion of the disk cartridge so that the storage disk inserted in the holder is placed at the read/write position on the turntable; and
  a movement mechanism for moving the holder and the disk cartridge from the read/write position of the turntable to an insertion position in response to a movement of the slider in a direction opposite to the first direction when the eject member is operated,
  wherein said eject member is mounted flat on an upper portion of a frame of the disk storage device, said eject member having
    an operation part which is operated by applying an external force thereto in a direction parallel to a surface of the turntable, said operation part of said eject member being formed with a planar portion extending along the surface of the upper portion of the frame substantially parallel to the surface of the turntable, said operation part being moved with a displacement from a first position to a second position different from the first position along the surface of the upper portion of the frame, and
    a transfer part connected to a mounting portion at an end of the slider, said transfer part of said ejection member being formed so as to extend downward from the center of the operation part and being formed with a connecting groove having an L-shaped cross section, and said transfer part being passed through a first opening formed in the upper portion of the frame and connected to the mounting portion of the slider so that the movement of the operation part, when the eject member is operated, is transferred to the slider via the transfer part,
  wherein the mounting portion of the slide is formed with a portion corresponding to said connecting groove, so that the mounting portion of the slider is fitted in the connecting groove of the transfer part, and so that the transfer part has a planar portion within the connecting groove which is at right angles to the movement of the operation part when the eject member is operated, and
  wherein said slider is moved in the direction opposite to the first direction when the operation part is operated, the movement mechanism moving the holder and the disk cartridge from the read/write position to the insertion position in response to said movement of the slider, so that the disk cartridge can be ejected from the holder at the insertion position.

2. A disk storage device comprising:

a head part for writing data to a storage disk inserted into the disk storage device and for reading data from the storage disk;

an eject member which is operated when the storage disk is ejected from the disk storage device;

a turntable for rotating and driving the storage disk thereon to perform data recording and reproducing in cooperation with the head part;

a holder for holding a disk cartridge accommodating the storage disk, said holder placing the storage disk at a read/write position on the turntable, when the disk cartridge is inserted, by fitting a center hole of the storage disk on a spindle of the turntable;

a slider which is disconnected from a latch lever when the disk cartridge is inserted, and is moved in a first direction substantially parallel to a direction of insertion of the disk cartridge so that the storage disk inserted in the holder is placed at the read/write position on the turntable; and a movement mechanism for moving the holder and the disk cartridge from the read/write position of the turntable to an insertion position in response to a movement of the slider in a direction opposite to the first direction when the eject member is operated, wherein said eject member is mounted flat on an upper portion of a frame of the disk storage device, said eject member having an operation part which is operated by applying an external force thereto in a direction parallel to a surface of the turntable, and a transfer part connected to a mounting portion at an end of the slider, said transfer part of said eject member being formed so as to extend downward from the center of the operation part, said transfer part being passed through a first opening formed in the upper portion of the frame and connected to the mounting portion of the slider so that the movement of the operation part, when the eject member is operated, is transferred to the slider via the transfer part, said slider being moved in the direction opposite to the first direction when the operation part is operated, the movement mechanism moving the holder and the disk cartridge from the read/write portion to the insertion position in response to said movement of the slider, so that the disk cartridge can be ejected from the holder at the insertion position; and wherein said operation part of said eject member is formed with a planar portion extending along the surface of the upper portion of the frame substantially parallel to the surface of the turntable, said operation part being moved with a displacement from a first position to a second position different from the first position along the surface of the upper portion of the frame, and wherein said eject member further comprises a set of projections extending sideways from said transfer part at portions immediately below said operation part, said projections having a first width between outside edges thereof which width is greater than a transverse width between inside edges of the first opening of the upper portion of the frame, said transverse width being measured at right angles to the first direction in which the slider is moved when the eject member is operated.

3. A disk storage device as claimed in claim 2, wherein said upper portion of the frame is formed with a pair of connecting portions extending sideways from the inside edges of the first opening, said connecting portions having a second width between inside edges thereof which width is smaller than said first width of the projections and which width is measured at right angles to the first direction in which the slider is moved when the eject member is operated, and said connecting portions being connected to said projections of the eject member at portions between the operation part of the eject member and the projections.

4. A disk storage device as claimed in claim 2, wherein said transfer part of said eject member is formed with a connecting groove having an L-shaped cross section, and the mounting portion of the slider is formed with a portion corresponding to said connecting groove, so that the mounting portion of the slider is fitted in the connecting groove of the transfer part, and so that the transfer part has a planar portion within the connecting groove which is at right angles to the movement of the operation part when the eject member is operated.

5. A disk storage device as claimed in claim 3, wherein said upper portion of the frame is formed with a second opening immediately below said connecting portions at said first opening, said second opening having a third width between inside edges of the second opening which width is greater than the first width of the projections, so that the projections of the eject member are passed between the inside edges of the second opening when the eject member is operated to move the operation part in the first direction.

6. A disk storage device according to claim 1, wherein said head part comprises a magnetic head part for writing data to a magnetic storage disk and reading data from the magnetic storage disk.

7. A disk storage device according to claim 1, wherein said head part comprises an optical head part for writing data to an optical storage disk and reading data from the optical storage disk.

8. A disk storage device according to claim 1, wherein said head part comprises a magneto-optic head part for writing data to a magneto-optic storage disk and reading data from the magneto-optic storage disk.

* * * * *